US008115708B2

(12) United States Patent
Hatalkar

(10) Patent No.: US 8,115,708 B2
(45) Date of Patent: Feb. 14, 2012

(54) SYSTEM AND METHOD FOR THE PREVENTION OF DISPLAY BURN-IN

(75) Inventor: Atul Hatalkar, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 968 days.

(21) Appl. No.: 11/292,698

(22) Filed: Dec. 2, 2005

(65) Prior Publication Data

US 2007/0127569 A1 Jun. 7, 2007

(51) Int. Cl.
*G09G 3/34* (2006.01)

(52) U.S. Cl. ............ 345/84; 348/173; 375/240.12; 375/240.26

(58) Field of Classification Search ............ 375/240; 348/173
See application file for complete search history.

(56) References Cited

U.S. PATENT DOCUMENTS

| | | | |
|---|---|---|---|
| 6,313,878 B1 | 11/2001 | Jankowiak | |
| 2003/0090488 A1 | 5/2003 | Yoo | |
| 2004/0196373 A1* | 10/2004 | Okano | 348/173 |
| 2004/0264791 A1 | 12/2004 | Jiang et al. | |
| 2005/0246657 A1* | 11/2005 | Widner | 715/805 |

FOREIGN PATENT DOCUMENTS

| | | |
|---|---|---|
| EP | 1 772 849 | 4/2007 |
| JP | 10/020838 A | 1/1998 |
| WO | 2007/064983 A1 | 6/2007 |

OTHER PUBLICATIONS

International Search Report for corresponding matter P22174PCT dated Apr. 23, 2007.
Office Action Received for Chinese Patent Application No. 200610064704.0, mailed on Nov. 14, 2008, 14 pages of Chinese Office Action and 6 pages of English Translation.
Office Action Received for Chinese Patent Application No. 200610064704.0, mailed on Oct. 23, 2009, 4 pages of Chinese Office Action and 6 pages of English Translation.
Office Action Received for Chinese Patent Application No. 200610064704.0, mailed on May 21, 2010, 4 pages of Chinese Office Action and 6 pages of English Translation.
International Preliminary Report on Patentability received for PCT Patent Application No. PCT/US2006/046175, mailed on Jun. 12, 2008, 8 pages.
International Search Report and Written Opinion received for PCT Patent Application No. PCT/US2006/046175, mailed on Apr. 23, 2007, 11 pages.
Office Action Received for Chinese Patent Application No. 201010624692.9, mailed on Jun. 30, 2011, 7 pages of Chinese Office Action including 4 pages of English Translation.

* cited by examiner

*Primary Examiner* — Alexander Eisen
*Assistant Examiner* — Robin Mishler

(57) ABSTRACT

A system and method for the prevention of display burn-in in Motion Picture Experts Group (MPEG) and non-MPEG environments. In one environment, a system may include an image sampler to sample images from a decoded video stream; a static area detector to successively compare the sampled images using a pixel-wise XOR operation, where the static area detector marks an area in the compared images that appear as zero brightness; and a burn-in prevention module to apply a burn-in preventative technique for a period of time to the marked area.

24 Claims, 9 Drawing Sheets

SYSTEM AND METHOD FOR THE PREVENTION OF DISPLAY BURN-IN

BACKGROUND

Some form of display is used in just about every imaginable field of human endeavor. Any application in which information of some form or another is to be conveyed will most probably use one or more displays to convey that information. Displays, which include screens, monitors, such as computer and video monitors, and projectors are indispensable to engineering, scientific, educational, government, military and entertainment endeavors.

A common problem with displays is that an image will burn into the display after the image has been static or unchanging for a long period of time. Cathode ray tub (CRT), plasma, and liquid crystal display (LCD) displays are well known examples of displays that are susceptible to the burn-in problem. Of course, the longer a static image is displayed, the greater the probability that burn-in will result. Burn-in of the static image results in an objectionable pattern that becomes visible when the display changes to another image. For example, in cases where large numbers of video communications links are continuously monitored, it is common that one or more displays will brightly display the same, unchanging image, such as logos, test patterns, or color bars, for long periods of time. Burn-in of an image in expensive displays, such as costly video monitors and projectors, is of particular concern.

BRIEF DESCRIPTION OF THE DRAWINGS

The invention may be best understood by referring to the following description and accompanying drawings that are used to illustrate embodiments of the invention. In the drawings.

DESCRIPTION OF EMBODIMENTS

Figure 1:
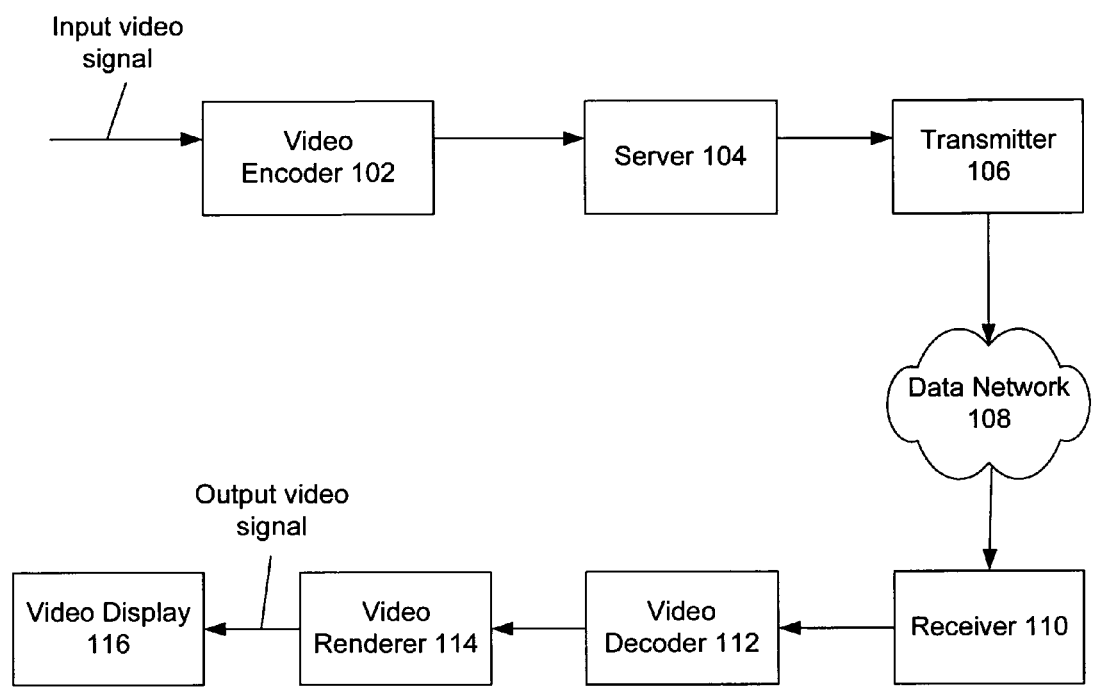
FIG. 1 illustrates an example of a typical video processing pipeline.

According to an embodiment of the invention, a system and method for the prevention of display burn-in are described. More specifically, embodiments of the present invention modify a typical video processing pipeline in order to prevent display burn-in in Motion Picture Experts Group (MPEG) and non-MPEG environments. In the following description, for purposes of explanation, numerous specific details are set forth. It will be apparent, however, to one skilled in the art that embodiments of the invention can be practiced without these specific details.

In the following detailed description of the embodiments, reference is made to the accompanying drawings that show, by way of illustration, specific embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention.

FIG. 1 illustrates an example of a typical video processing pipeline. Referring to FIG. 1, the input video signal is fed into a video encoder 102, which converts the signal into video data in the form of a machine-readable series of bits or bit stream. The video data may then be stored on a server 104, pending a request for the video data. When the server 104 receives a request for the video data, it sends the data to a transmitter 106, which transmits the data along a communication channel or data network 108. A receiver 110 receives the video data and sends the data as a bit stream to a video decoder 112. Decoder 112 converts the received bit stream which is then fed into video renderer 114 which produces an output video signal. The output video signal is displayed on a video display 116. Video display 116 may be, but is not necessarily limited to, any type of screen, monitor, such as computer and video monitors, or projector. This may include digital set-top boxes, digital televisions, handheld video player, and so forth.

The encoding in encoder 102 may involve lossy compression techniques, such as MPEG2 or MPEG4, resulting in a base layer. The base layer is a body of data sufficient to permit generation of a viewable video sequence of lesser quality than is represented by the source video sequence. The base layer comprises a low-bandwidth version of the video sequence. If it were to be decoded and viewed, the base layer would be perceived as an inferior version of the original video. MPEG is short for Motion Picture Experts Group and MPEG2 and MPEG4 represent digital video compression standards and file formats developed by the group.

One lossy compression technique employed by MPEG is to encode most of the pictures in the video sequence as changes from one picture to the next, rather than as the picture data itself. This technique results in a considerable saving of bandwidth.

Other bodies of data, called enhancement layers, may capture the difference between a quantized base video picture and an original unquantized input video picture. Enhancement layers enhance the quality of the viewable video sequence generated from the base layer. Combining the base layer with a single enhancement layer at the receiving end produces a correction to the video data and an improved output video. Combining an additional enhancement layer provides additional correction and additional improvement. Combining the base layer with all enhancement layers at the receiving end will result in a video output of quality nearly equal to the original input video.

An enhancement layer corresponding to a picture may contain a correction to the change from one picture to the next, or it may contain a correction to the picture data itself. An enhancement layer generally corresponds to a base layer. If a picture in the base layer is encoded as changes from one picture to the next, then the enhancement layers corresponding to that picture generally contain a correction to the change from one picture to the next.

Typically each enhancement layer is one bit slice of the difference data. In such an arrangement, each enhancement layer for each picture would have a series of bits. The enhancement layers are ordered in such a way that the first enhancement layer would contain the most significant bits; the second enhancement layer would contain the next most significant bits; and so on. This means that the most significant correction would be made by the first enhancement layer. Combining more enhancement layers would continue to improve the output quality. In this way, the quality of the output video can be scaled by combining different numbers of enhancement layers with the base layer.

Figure 2:
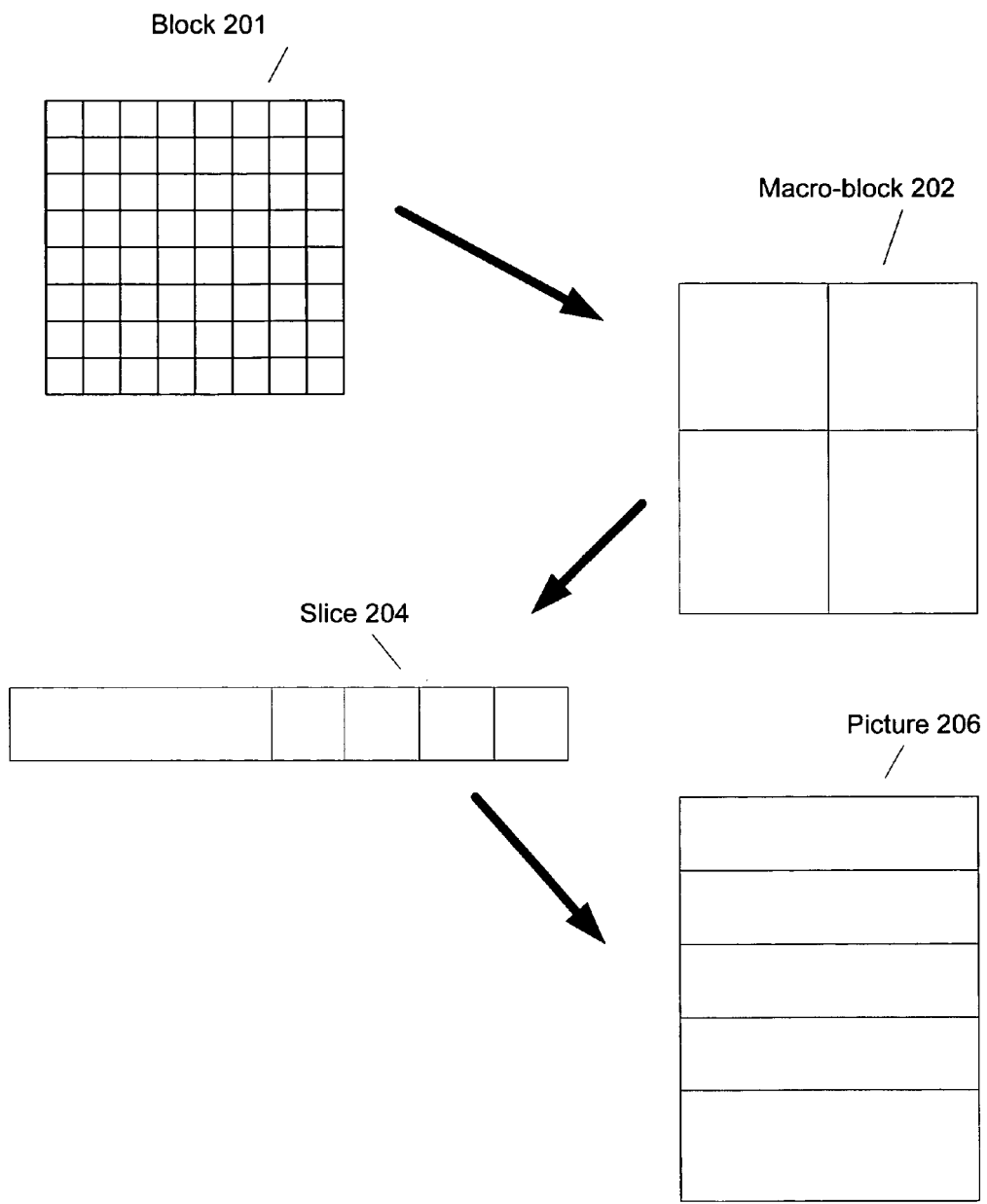
FIG. 2 illustrates a hierarchical representation of units making up a typical video picture.

FIG. 2 illustrates a hierarchical representation of units making up a typical video picture. In general, a picture is made up of picture elements or pixels. Referring to FIG. 2, an 8×8 square of pixels forms a block 201, and a 2×2 square of blocks forms a macro-block 202. Macro-blocks placed side-by-side may form a slice 204 of picture data. A slice is a horizontal strip of the picture, and a sequence of slices may compose a picture 206.

During the MPEG encoding process, the picture data may undergo a transformation process as a part of data compression. A widely-used transform is the discrete cosine transform (DCT). The DCT is a linear transform similar to the discrete Fourier transform in that the transformed data are ordered by frequency and are weighted by coefficients. An 8×8 block of pixels undergoing a DCT will generate an 8×8 matrix of coefficients. The DCT may operate on groups of pixels of other sizes as well, such as a 16×16 block, but the transform of an 8×8 block is an exemplary application of the DCT.

In general, the DCT treats each 8×8 block of pixels as a discrete signal. The DCT creates an 8×8 matrix of coefficients representing the horizontal frequency and the vertical frequency of the pixels. Generally speaking, frequency relates to how often a quantity changes. Zero frequency means no change at all.

Figure 9:
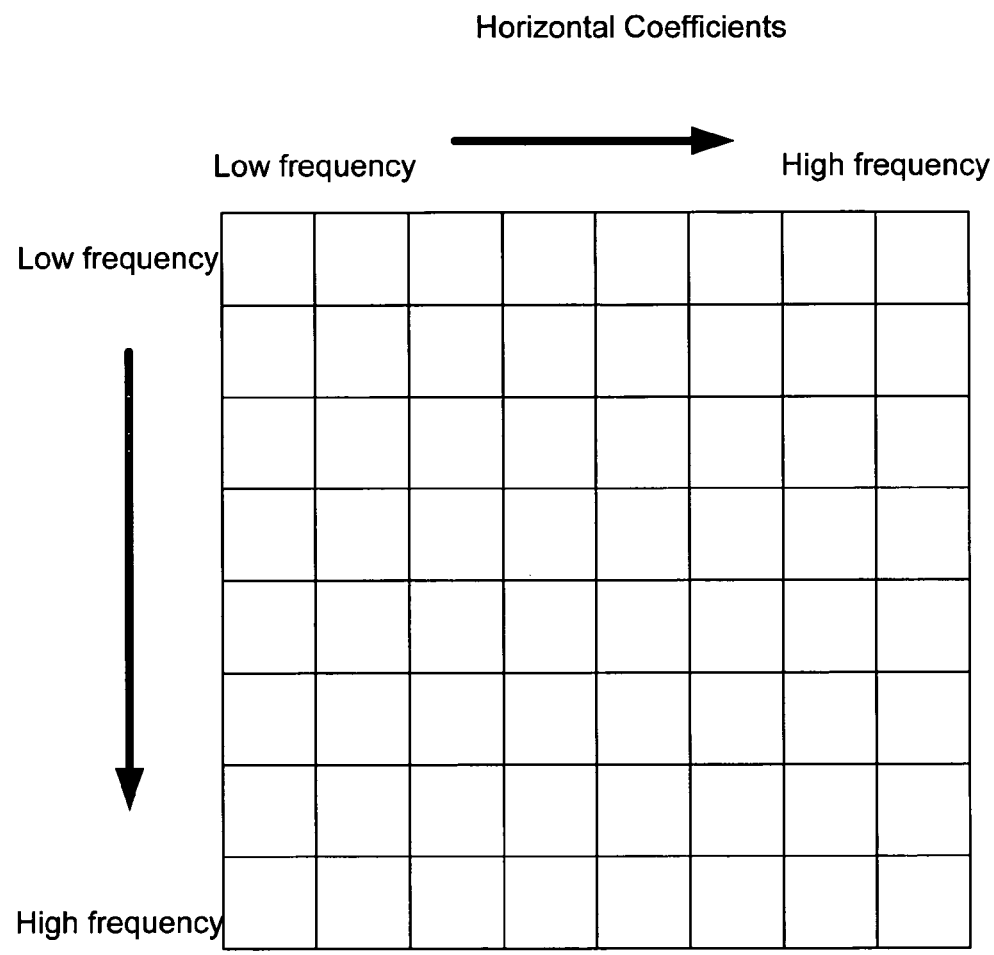
FIG. 9 illustrates how a discrete cosine transform (DCT) arranges the coefficients in an 8×8 matrix.

FIG. 9 illustrates how a DCT arranges the coefficients in an 8×8 matrix. Referring to FIG. 9, the horizontal coefficients are ordered with the lower-frequency terms on the left and the higher-frequency terms on the right. The vertical coefficients are ordered with the lower-frequency terms on the top and the higher-frequency terms on the bottom. The coefficient stored in the uppermost leftmost cell represents the portion of the 8×8 block of pixels that has zero horizontal frequency and zero vertical frequency, the portion that is constant throughout the block. This coefficient may represent the average color and brightness of the entire block of pixels. The coefficient stored in the lowermost rightmost cell represents the highest amount of horizontal and vertical change within the block.

Figure 3:
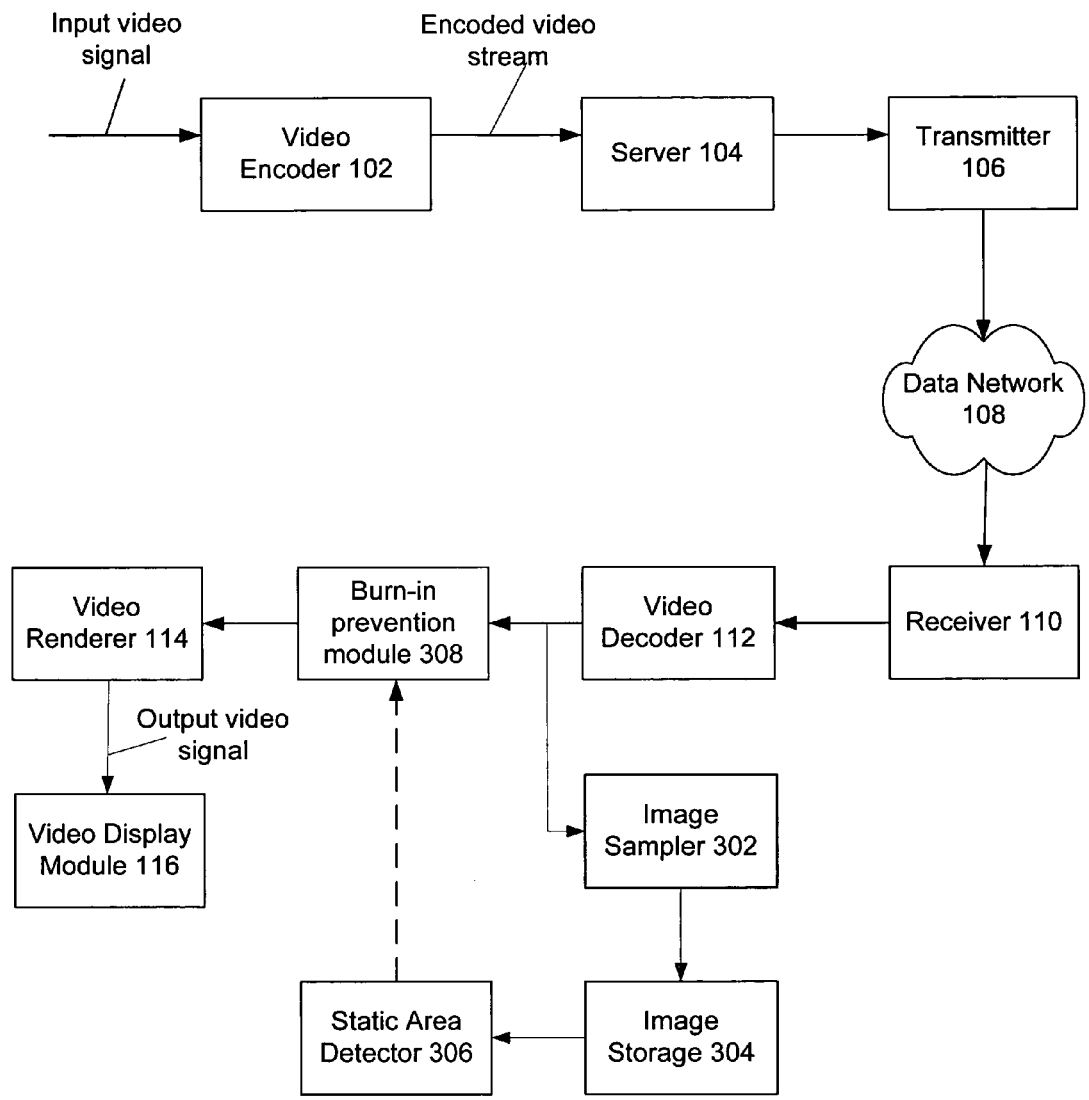
FIG. 3 illustrates an embodiment of an environment for the prevention of display burn-in, in which some embodiments of the present invention may operate.
Figure 4:
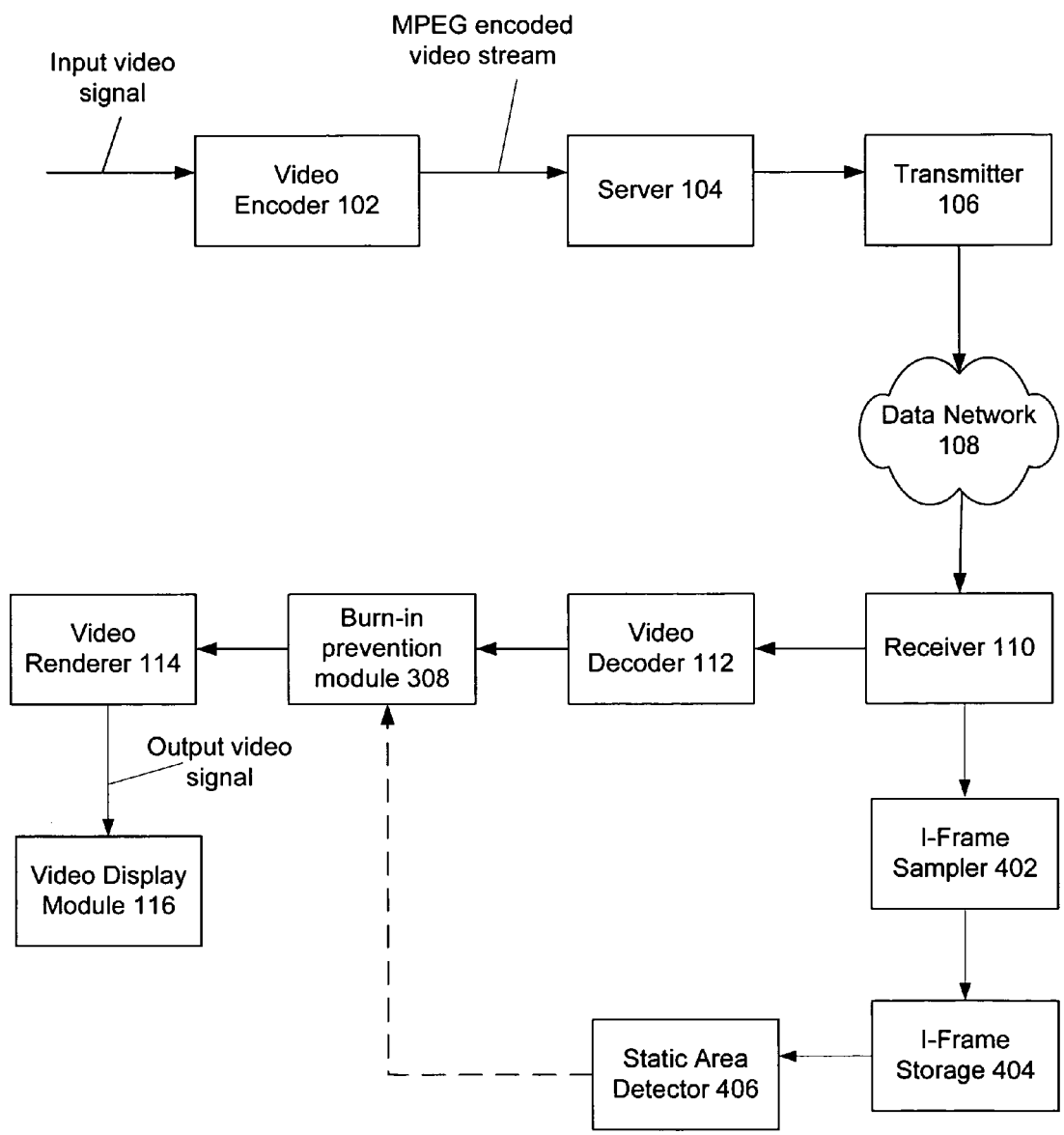
FIG. 4 illustrates an embodiment of an environment for the prevention of display burn-in, in which some embodiments of the present invention may operate.
Figure 5:
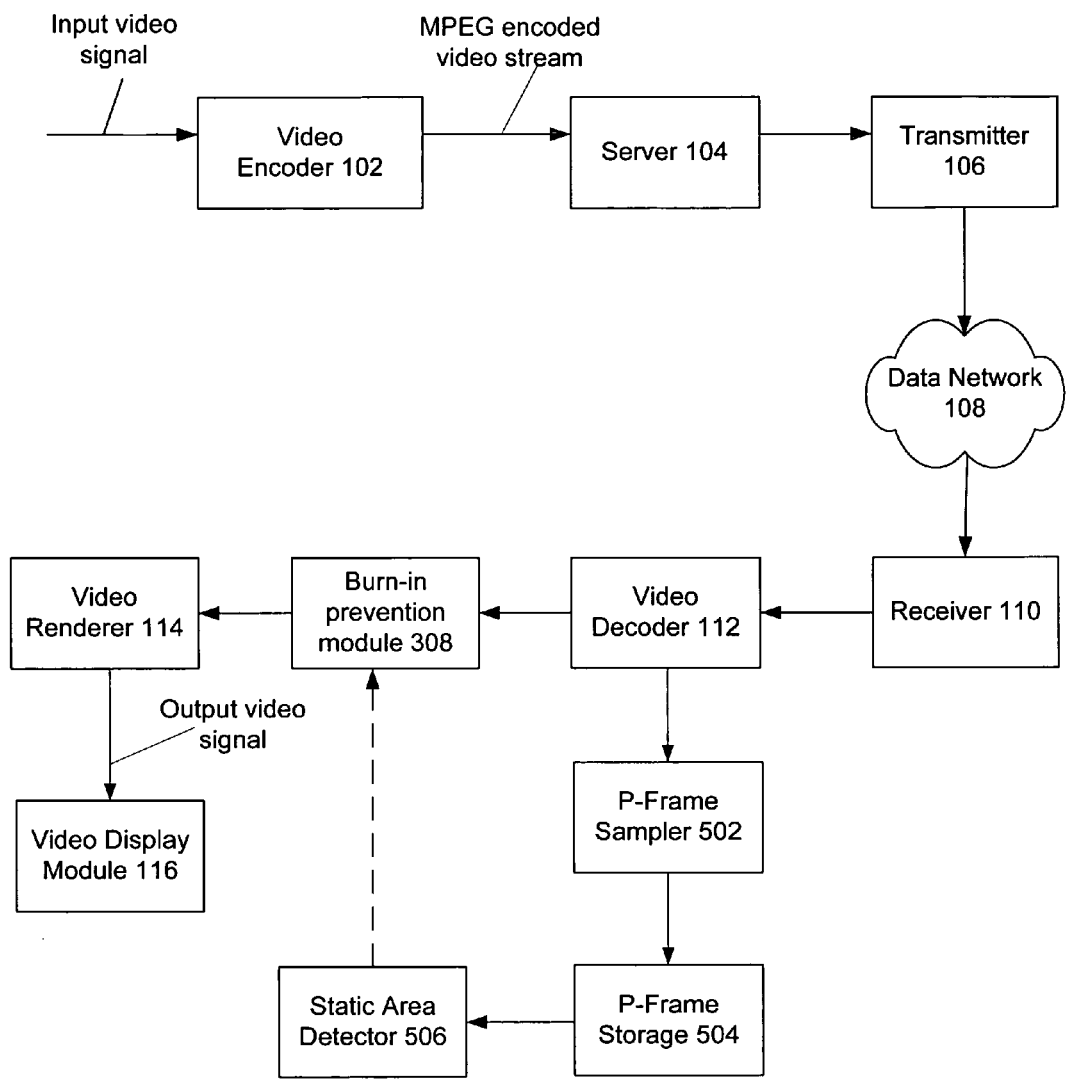
FIG. 5 illustrates an embodiment of an environment for the prevention of display burn-in, in which some embodiments of the present invention may operate.

FIGS. 3-5 of the present invention illustrate how the typical video processing pipeline of FIG. 1 may be modified to allow for the prevention of display burn-in. More specifically, FIG. 3 illustrates an embodiment of MPEG and non-MPEG environments for the prevention of display burn-in, in which some embodiments of the present invention may operate. FIGS. 4 and 5 each illustrates an embodiment of a MPEG environment for the prevention of display burn-in, in which some embodiments of the present invention may operate.

The specific components shown in each of FIGS. 3-5 represent one example of a configuration that may be suitable for the invention and is not meant to limit the invention. Thus, other embodiments of the invention may include more or less components as described in each of FIGS. 3-5. For example, the functionality of two or more components of FIGS. 3-5 may be combined into one component. Likewise, the functionality of one component of FIGS. 3-5 may be separated and performed by more than one component. Each component shown in FIGS. 3-5 may be implemented as a hardware element, as a software element executed by a processor, as a silicon chip encoded to perform its functionality described herein, or any combination thereof.

The environments of each of FIGS. 3-5 may be implemented as a wired communication system, a wireless communication system, or a combination of both. Although the environment of each of FIGS. 3-5 may be illustrated using a particular communications media by way of example, it may be appreciated that the principles and techniques discussed herein may be implemented using any type of communication media and accompanying technology. The embodiments are not limited in this context. Other communication systems may be added or substituted according to the particular application for the environment in FIGS. 3-5 and/or as new types of systems are developed.

Referring now to FIG. 3, an image sampler 302, image storage 304, a static area detector 306 and a burn-in prevention module 308 may be added to the pipeline of FIG. 1 to facilitate in the prevention of display burn-in in MPEG and non-MPEG environments. Here, video images may be sampled via image sampler 302 after the video decoding operation and before any scaling or post processing. In an embodiment not meant to limit the invention, the video images may be sampled at the rate of ten (10) per minute by image sampler 302.

The sampled images may then be stored in image storage 304. Static area detector 306 retrieves the stored images from storage 304 and successively compares the sampled images using a pixel-wise XOR operation. The comparison operation results in compared images. Here, areas in the compared images whose pixels appear as zero brightness may be marked as static areas. This static area detection technique may be used individually as described or it may be combined with one or more of the other static area detection techniques described herein or any other static area detection technique.

In an embodiment of the invention, static area detector 306 is capable of determining the severity of static-ness of the static areas. The severity of static-ness may be determined in several ways. For example, if the same area of an image is being detected as static again and again over a long period of time (e.g., when a child pauses a game and leaves for school), then that area may be determined as having a high severity of static-ness. Thus, static area detector 306 may maintain this type of temporal statistical information and use the information to compute the severity of static-ness.

The output of static area detector 306 is a control signal that is sent to burn-in prevention module 308. In an embodiment of the invention, the control signal may contain information about currently detected static areas and an indication of the severity of static-ness for each area.

Burn-in prevention module 308 may then apply a burn-in preventative technique to the marked static areas in each decoded frame of video prior to forwarding the decoded frame to video renderer 114. In an embodiment of the invention, the burn-in preventative technique may be applied for several seconds to each decoded frame of video in the pipeline. Burn-in prevention module 308 may use the severity information provided in the control signal sent from the static area detector 306 to determine which burn-in preventative techniques(s) to apply.

A burn-in preventative technique of the present invention may include blacking out all pixels in the areas marked as static. The affect of this technique is to give these pixels time to "cool down" and thus preventing burn-in. This technique may be used for areas that have been determined to have a high severity of static-ness. Another burn-in preventative technique of the present invention is to insert a "reverse pixel" pattern in the areas marked as static. The affect of this technique is to change the brightness of these pixels to prevent burn-in. An additional burn-in preventative technique of the present invention is to apply a blur-filter to the areas marked as static. Here, the reduction of the brightness of the pixels helps to prevent burn-in. This technique may be used for areas that have been determined to have a lesser severity of static-ness. Yet another burn-in preventative technique of the present invention is to explicitly change the colors of the pixels in the static areas and thus preventing burn-in. The burn-in preventative techniques provided herein are for illustrative purposes only and are not meant to limit the invention. The burn-in prevention techniques may be used individually as described or they may be combined. Operations for the components described in FIG. 3 are further described with reference to FIG. 6 below.

FIG. 4 illustrates an embodiment of a MPEG environment for the prevention of display burn-in, in which some embodiments of the present invention may operate. Referring to FIG. 4, an I-Frame sampler 402, I-Frame storage 404, a static area detector 406 and burn-in prevention module 308 (FIG. 3) may be added to the pipeline of FIG. 1 to facilitate in the prevention of display burn-in in a MPEG environment. Here, I-Frames may be sampled via I-Frame sampler 402 from the MPEG encoded video stream. This sampling of I-Frames is done prior to any video decoding of the MPEG encoded video stream. In an embodiment not meant to limit the invention, the I-Frames may be sampled six (6) seconds apart by I-Frame sampler 402.

The sampled I-Frames may then be stored in I-Frame storage 404. Static area detector 406 retrieves the stored I-Frames from storage 404 and successively compares the sampled I-Frames using a pixel-wise XOR operation. In embodiments not meant to limit the invention, the I-Frames may be compared at the macro-block level (see, e.g., macro-block 202 in FIG. 2) or may be compared at the 8×8 DCT matrix level (see, e.g., block 201 in FIG. 2). Here, areas in the compared I-Frames whose coefficients match may be marked as static areas. This static area detection technique may be used individually as described or it may be combined with one or more of the other static area detection techniques described herein or any other static area detection technique.

In an embodiment of the invention, static area detector 406 is capable of determining the severity of static-ness of the static areas. The severity of static-ness may be determined as described above with reference to FIG. 3. Static area detector 406 may maintain temporal statistical information and use this information to compute the severity of static-ness.

The output of static area detector 406 is a control signal that is sent to burn-in prevention module 308. In an embodiment of the invention, the control signal may contain information about currently detected static areas and an indication of the severity of static-ness for each area.

After decoding, burn-in prevention module 308, as described above with reference to FIG. 3, may then apply a burn-in preventative technique to the marked static areas in each decoded frame of video prior to forwarding the frame to video renderer 114. As described above, burn-in prevention module 308 may use the severity information provided in the control signal sent from the static area detector 406 to determine which burn-in preventative techniques(s) to apply. Operations for the components described in FIG. 4 are further described with reference to FIG. 7 below.

FIG. 5 illustrates another embodiment of a MPEG environment for the prevention of display burn-in, in which some embodiments of the present invention may operate. Referring to FIG. 5, a P-Frame sampler 502, P-Frame storage 504, a static area detector 506 and burn-in prevention module 308 (FIG. 3) may be added to the pipeline of FIG. 1 to facilitate in the prevention of display burn-in in a MPEG environment. Here, P-Frames may be sampled via P-Frame sampler 502. This sampling of P-Frames occurs during decoding of the MPEG encoded video stream via video decoder 112. In an embodiment not meant to limit the invention, the P-Frames may be sampled six (6) seconds apart by P-Frame sampler 502.

The sampled P-Frames may then be stored in P-Frame storage 504. Static area detector 506 retrieves the stored P-Frames from storage 504 and successively compares the sampled P-Frames. Here, areas in the compared P-Frames whose motion-vectors show "zero motion" over several minutes of sampled P-Frames may be marked as static areas. This static area detection technique may be used individually as described or it may be combined with one or more of the other static area detection techniques described herein or any other static area detection technique.

In an embodiment of the invention, static area detector 506 is capable of determining the severity of static-ness of the static areas. The severity of static-ness may be determined as described above with reference to FIG. 3. Static area detector 506 may maintain temporal statistical information and use this information to compute the severity of static-ness.

The output of static area detector 506 is a control signal that is sent to burn-in prevention module 308. In an embodiment of the invention, the control signal may contain information about currently detected static areas and an indication of the severity of static-ness for each area.

After decoding, burn-in prevention module 308, as described above with reference to FIG. 3, may then apply a burn-in preventative technique to the marked static areas in each decoded frame of video prior to forwarding the frame to video renderer 114. As described above, burn-in prevention module 308 may use the severity information provided in the control signal sent from the static area detector 506 to determine which burn-in preventative techniques(s) to apply. Operations for the components described in FIG. 5 are further described with reference to FIG. 8 below.

Embodiments of the operation of the present invention are described next with reference to FIGS. 6-8. The flow diagrams and other descriptions of processes herein are not intended to imply a fixed order of performing the process stages. Rather, the process stages may be performed in any order that is practicable.

Figure 6:
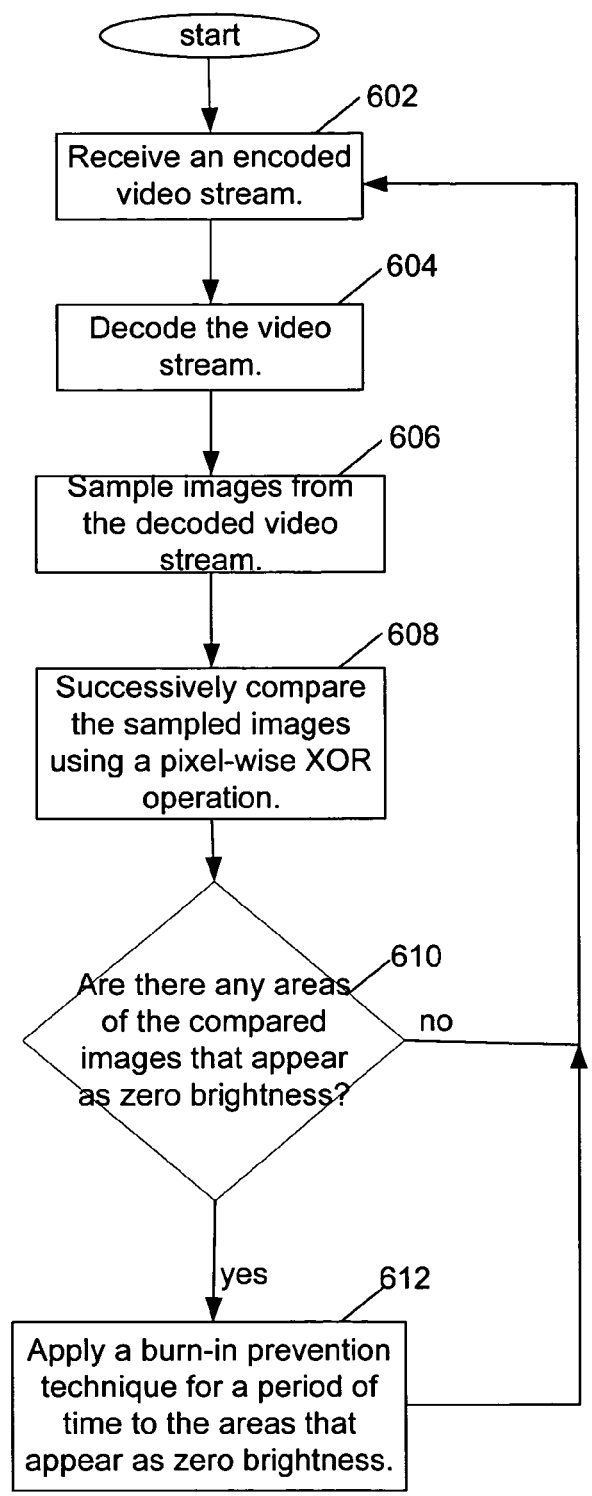
FIG. 6 is a flow diagram of one embodiment of a process for the operation of preventing display burn-in, in which some embodiments of the present invention may operate.

FIG. 6 is a flow diagram of one embodiment of a process for the operation of preventing display burn-in in MPEG and non-MPEG environments, in which some embodiments of the present invention may operate. Referring to FIG. 6, the process begins at processing block 602 where an encoded video stream is received. The video stream is then decoded at processing block 604.

In an embodiment of the invention, the video images are sampled at the rate of ten (10) per minute by image sampler 302 at processing block 606. At processing block 608, static area detector 306 successively compares the sampled images using a pixel-wise XOR operation.

At decision block 610, if there are any areas of the compared images that appear as zero brightness, then at processing block 612, one or more of the burn-in prevention techniques described above are applied to the static area via burn-in prevention module 308. The flow diagram continues back at processing block 602 to detect for static areas.

Figure 7:
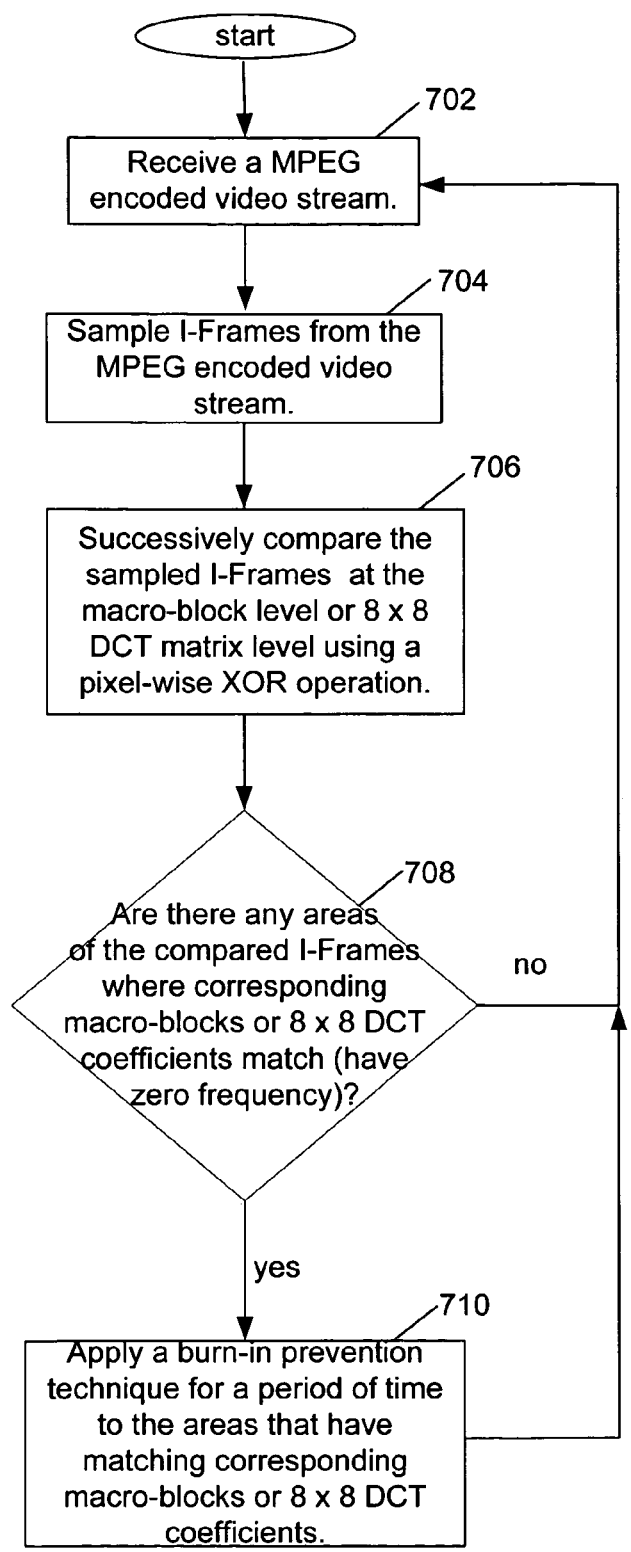
FIG. 7 is a flow diagram of one embodiment of a process for the operation of preventing display burn-in, in which some embodiments of the present invention may operate.

FIG. 7 is a flow diagram of one embodiment of a process for the operation of preventing display burn-in in a MPEG environment, in which some embodiments of the present invention may operate. Referring to FIG. 7, the process begins at processing block 702 where a MPEG encoded video steam is received. Prior to any decoding, I-Frames from the MPEG encoded video stream are sampled via I-Frame sampler 402 (FIG. 4) at processing block 704. In an embodiment not meant to limit the invention, the I-Frames may be sampled six (6) seconds apart.

At processing block 706, static area detector 406 successively compares the sampled I-Frames using a pixel-wise XOR operation. In embodiments not meant to limit the invention, the I-Frames may be compared at the macro-block level or may be compared at the 8×8 DCT matrix level.

At decision block 708, if areas in the compared images have matching coefficients, then at processing block 710 and after decoding of the MPEP video stream, one or more of the burn-in prevention techniques described above are applied to the static area via burn-in prevention module 308. The flow diagram continues back at processing block 702 to detect for static areas.

Figure 8:
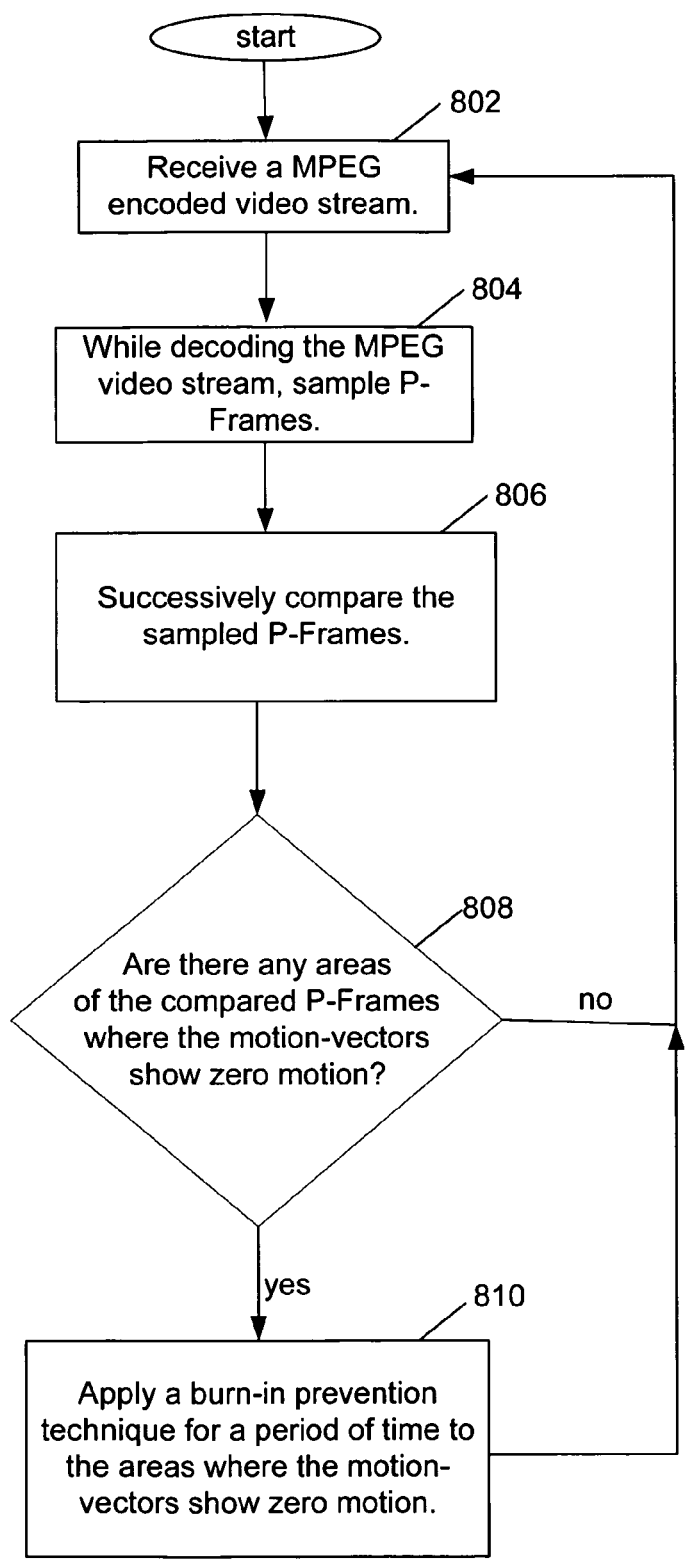
FIG. 8 is a flow diagram of one embodiment of a process for the operation of preventing display burn-in, in which some embodiments of the present invention may operate.

FIG. 8 is a flow diagram of one embodiment of a process for the operation of preventing display burn-in in a MPEG environment, in which some embodiments of the present invention may operate. Referring to FIG. 8, the process begins at processing block 802 where a MPEG encoded video steam is received. While decoding the MPEG video stream, P-Frames are sampled via P-Frame sampler 502 (FIG. 5) at processing block 804. In an embodiment not meant to limit the invention, the P-Frames may be sampled six (6) seconds apart.

At processing block 806, static area detector 506 successively compares the sampled P-Frames. At decision block 808, if areas in the compared P-Frames have motion-vectors that show zero motion, then at processing block 810, after decoding of the MPEP video stream, one or more of the burn-in prevention techniques described above are applied to the static area via burn-in prevention module 308. The flow diagram continues back at processing block 802 to detect for static areas.

Embodiments of the present invention may be implemented in software, firmware, hardware or by any combination of various techniques. For example, in some embodiments, the present invention may be provided as a computer program product or software which may include a machine or computer-readable medium having stored thereon instructions which may be used to program a computer (or other electronic devices) to perform a process according to the present invention. In other embodiments, steps of the present invention might be performed by specific hardware components that contain hardwired logic for performing the steps, or by any combination of programmed computer components and custom hardware components.

Thus, a machine-readable medium may include any mechanism for storing or transmitting information in a form readable by a machine (e.g., a computer). These mechanisms include, but are not limited to, a hard disk, floppy diskettes, optical disks, Compact Disc, Read-Only Memory (CD-ROMs), magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, a transmission over the Internet, electrical, optical, acoustical or other forms of propagated signals (e.g., carrier waves, infrared signals, digital signals, etc.) or the like.

Some portions of the detailed descriptions above are presented in terms of algorithms and symbolic representations of operations on data bits within a computer system's registers or memory. These algorithmic descriptions and representations are the means used by those skilled in the data processing arts to convey the substance of their work to others skilled in the art most effectively. An algorithm is here, and generally, conceived to be a self-consistent sequence of operations leading to a desired result. The operations are those requiring physical manipulations of physical quantities. Usually, although not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussions, it is appreciated that discussions utilizing terms such as "processing" or "computing" or "calculating" or "determining" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Reference throughout this specification to "one embodiment" or "an embodiment" means that a particular feature, structure, or characteristic described in connection with the embodiment is included in at least one embodiment of the invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A system comprising:
an image sampler to sample images from a decoded video stream;
a static area detector to successively compare the sampled images, wherein the static area detector is to mark an area in the compared images that appear as zero brightness; and
a burn-in prevention module to apply a burn-in preventative technique for a period of time to the marked area;
wherein the static area detector is to determine a severity of static-ness for the marked area, and is to generate an indication of the severity of static-ness for the marked area;
wherein the burn-in prevention module is to select the burn-in preventative technique from a plurality of techniques corresponding to the indication of the severity of static-ness for the marked area; and wherein the plurality of techniques includes a first technique for a particular severity of static-ness and a second technique for a lesser severity of static-ness.

2. The system of claim 1, wherein the image sampler is to sample the images at a rate of ten (10) images per minute.

3. The system of claim 1, wherein the plurality of burn-in preventative techniques includes blacking out all pixels in the marked area, inserting a reverse pixel pattern in the marked area, applying a blur-filter to the marked area, and changing the color of each of the pixels in the marked area.

4. A system comprising:
an I-Frame sampler to sample I-Frames from a Motion Picture Experts Group (MPEG) encoded video stream;
a static area detector to successively compare the sampled I-Frames using an XOR operation, wherein the static area detector is to mark an area in the compared I-Frames that have matching coefficients; and
a burn-in prevention module to apply a burn-in preventative technique for a period of time to the marked area;
wherein the static area detector is to determine a severity of static-ness for the marked area, and is to generate an indication of the severity of static-ness for the marked area;
wherein the burn-in prevention module is to determine the burn-in preventative technique from a plurality of techniques corresponding to the indication of the severity of static-ness; and
wherein the plurality of techniques includes a first technique for a particular severity of static-ness and a second technique for a lesser severity of static-ness.

5. The system of claim 4, wherein the static area detector is to successively compare the sampled I-Frames at the macro-block level.

6. The system of claim 4, wherein the static area detector is to successively compare the sampled I-Frames at the 8×8 discrete cosine transform (DCT) matrix level.

7. The system of claim 4, wherein the I-Frame sampler is to sample the I-Frames at a rate of six (6) seconds apart.

8. The system of claim 4, wherein the plurality of burn-in preventative techniques includes blacking out all pixels in the marked area, inserting a reverse pixel pattern in the marked area, applying a blur-filter to the marked area, and changing the color of each of the pixels in the marked area.

9. A system comprising:
a P-Frame sampler to sample P-Frames during the decoding of a Motion Picture Experts Group (MPEG) encoded video stream;
a static area detector to successively compare the sampled P-Frames, wherein the static area detector is to mark an area in the compared P-Frames where the motion-vectors show zero motion; and
a burn-in prevention module to apply a burn-in preventative technique for a period of time to the marked area;
wherein the static area detector is to determine a severity of static-ness for the marked area, and is to generate an indication of the severity of static-ness for the marked area; and
wherein the burn-in prevention module is to select the burn-in preventative technique from a plurality of techniques corresponding to the indication of the severity of static-ness for the marked area; and
wherein the plurality of techniques includes a first technique for a particular severity of static-ness and a second technique for a lesser severity of static-ness.

10. The system of claim 9, wherein the P-Frame sampler is to sample the P-Frames at a rate of six (6) seconds apart.

11. The system of claim 9, wherein the plurality of burn-in preventative techniques includes blacking out all pixels in the marked area, inserting a reverse pixel pattern in the marked area, applying a blur-filter to the marked area, and changing the color of each of the pixels in the marked area.

12. A method comprising:
sampling images from a decoded video stream;
successively comparing the sampled images;
marking an area in the compared images that appear as zero brightness;
determining a severity of static-ness for the marked area;
generating an indication of the severity of static-ness for the marked area;
selecting a burn-in preventative technique from a plurality of techniques corresponding to the indication of the severity of static-ness for the marked area; and
applying the burn-in preventative technique for a period of time to the marked area
wherein the plurality of techniques includes a first technique for a particular severity of static-ness and a second technique for a lesser severity of static-ness.

13. The method of claim 12, wherein the images are sampled at a rate of ten (10) images per minute.

14. The method of claim 12, wherein the plurality of burn-in preventative techniques includes blacking out all pixels in the marked area, inserting a reverse pixel pattern in the marked area, applying a blur-filter to the marked area, and changing the color of each of the pixels in the marked area.

15. A method comprising:
sampling I-Frames from a Motion Picture Experts Group (MPEG) encoded video stream;
successively comparing the sampled I-Frames using a pixel-wise XOR operation;
marking an area in the compared I-Frames that have matching coefficients;
determining a severity of static-ness for the marked area;
generating an indication of the severity of static-ness for the marked area;
selecting a burn-in preventative technique from a plurality of techniques corresponding to the indication of the severity of static-ness for the marked area; and
applying the burn-in preventative technique for a period of time to the marked area;
wherein the plurality of techniques includes a first technique for a particular severity of static-ness and a second technique for a lesser severity of static-ness.

16. The method of claim 15, wherein the sampled I-Frames are successively compared at the macro-block level.

17. The method of claim 15, wherein the sampled I-Frames are successively compared at the 8×8 discrete cosine transform (DCT) matrix level.

18. The method of claim 15, wherein the I-Frames are sampled at a rate of six (6) seconds apart.

19. The method of claim 15, wherein the plurality of burn-in preventative techniques includes blacking out all pixels in the marked area, inserting a reverse pixel pattern in the marked area, applying a blur-filter to the marked area, and changing the color of each of the pixels in the marked area.

20. A method comprising:
sampling P-Frames during the decoding of a Motion Picture Experts Group (MPEG) encoded video stream;
successively comparing the sampled P-Frames;
marking an area in the compared P-Frames where the motion-vectors show zero motion;
determining a severity of static-ness for the marked area;

generating an indication of the severity of static-ness for the marked area;

selecting a burn-in preventative technique from a plurality of techniques corresponding to the indication of the severity of static-ness for the marked area; and applying the burn-in preventative technique for a period of time to the marked area;

wherein the plurality of techniques includes a first technique for a particular severity of static-ness and a second technique for a lesser severity of static-ness.

21. The method of claim 20, wherein the P-Frame sampler is to sample the P-Frames at a rate of six (6) seconds apart.

22. The method of claim 20, wherein the plurality of burn-in preventative techniques includes blacking out all pixels in the marked area, inserting a reverse pixel pattern in the marked area, applying a blur-filter to the marked area, and changing the color of each of the pixels in the marked area.

23. The system of claim 1, wherein said static area detector is to successively compare the sampled images using a pixel-wise XOR operation.

24. The method of claim 12, wherein said successively comparing the sampled images comprises successively comparing the sampled images using a pixel-wise XOR operation.

* * * * *